US008452963B2

(12) United States Patent
Singer

(10) Patent No.: US 8,452,963 B2
(45) Date of Patent: May 28, 2013

(54) GENERATING PROTECTED ACCESS CREDENTIALS

(75) Inventor: Noam Singer, Kibbutz Einat (IL)

(73) Assignee: Cisco Technology, Inc., San Jose, CA (US)

(*) Notice: Subject to any disclaimer, the term of this patent is extended or adjusted under 35 U.S.C. 154(b) by 668 days.

(21) Appl. No.: 12/360,742

(22) Filed: Jan. 27, 2009

(65) Prior Publication Data

US 2010/0191970 A1    Jul. 29, 2010

(51) Int. Cl.
*H04L 9/32* (2006.01)
(52) U.S. Cl.
USPC ............... 713/171; 713/153; 380/44; 380/47
(58) Field of Classification Search
USPC ..................... 713/153, 171; 380/47
See application file for complete search history.

(56) References Cited

U.S. PATENT DOCUMENTS 7,502,467 B2 *   3/2009   Brainard et al. ............... 380/44
7,822,200 B2 *  10/2010   Cameron et al. .............. 380/44
2006/0002550 A1 *  1/2006   Campagna et al. ............ 380/46
2006/0212928 A1 *  9/2006   Maino et al. ..................... 726/4
2007/0174614 A1 *  7/2007   Duane et al. ................. 713/168
2009/0067623 A1 *  3/2009   Lei et al. ........................ 380/44

* cited by examiner

*Primary Examiner* — Amare F Tabor
(74) *Attorney, Agent, or Firm* — Hickman Palermo Truong Becker Bingham Wong LLP

(57) ABSTRACT

A computer-implemented process comprises receiving, at a first computer, a base cryptographic seed through a secure connection to a second computer; generating one or more protected access credential parameters; combining said base cryptographic seed with at least a portion of said generated protected access credential parameters using a hashed message authentication code function to generate a master key; encrypting at least a portion of said generated protected access credential parameters using at least a portion of said generated master key; incorporating said encrypted protected access credential parameters and at least a portion of said generated protected access credential parameters into a protected access credential. In an embodiment, a master server securely distributes the seed and the process is performed by a plurality of access servers to separately generate the same master key for use in subsequent authentication communications using an authentication protocol such as EAP-FAST.

20 Claims, 5 Drawing Sheets

GENERATING PROTECTED ACCESS CREDENTIALS

TECHNICAL FIELD

The present disclosure generally relates to network security and more specifically to network security between a client computing system and host computing system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network access solutions requiring user friendly and easily deployable secure authentication mechanisms need strong mutual authentication protocols that are not necessarily dependent on computation intensive and, in some cases, potentially costly exchanges of digital certificates. For example, RFC4851, "Extensible Authentication Protocol based Flexible Authentication via Secure Tunneling Protocol (EAP-FAST)," provides a Transport Layer Security (TLS) tunnel using a TLS version mutually supported by both a client and a network access server. Once a secure tunnel is established, EAP-FAST exchanges data in the form of type, length, and value (TLV) objects to perform authentication.

EAP-FAST provides authentication using a Protected Access Credential (PAC). The PAC generally includes an encrypted set of parameters and a set of unencrypted parameters. An initialization vector may be used to provide better variance when encrypting and decrypting the PAC encrypted portion. The encrypted set of parameters is sent to the client in a protected access credential and is presented to the network authentication server when the client requests access to network resources. The network access server then attempts to verify the contents of the encrypted set of parameters and if verified, the client is granted access to the network by the network access server.

DETAILED DESCRIPTION

Figure 1:
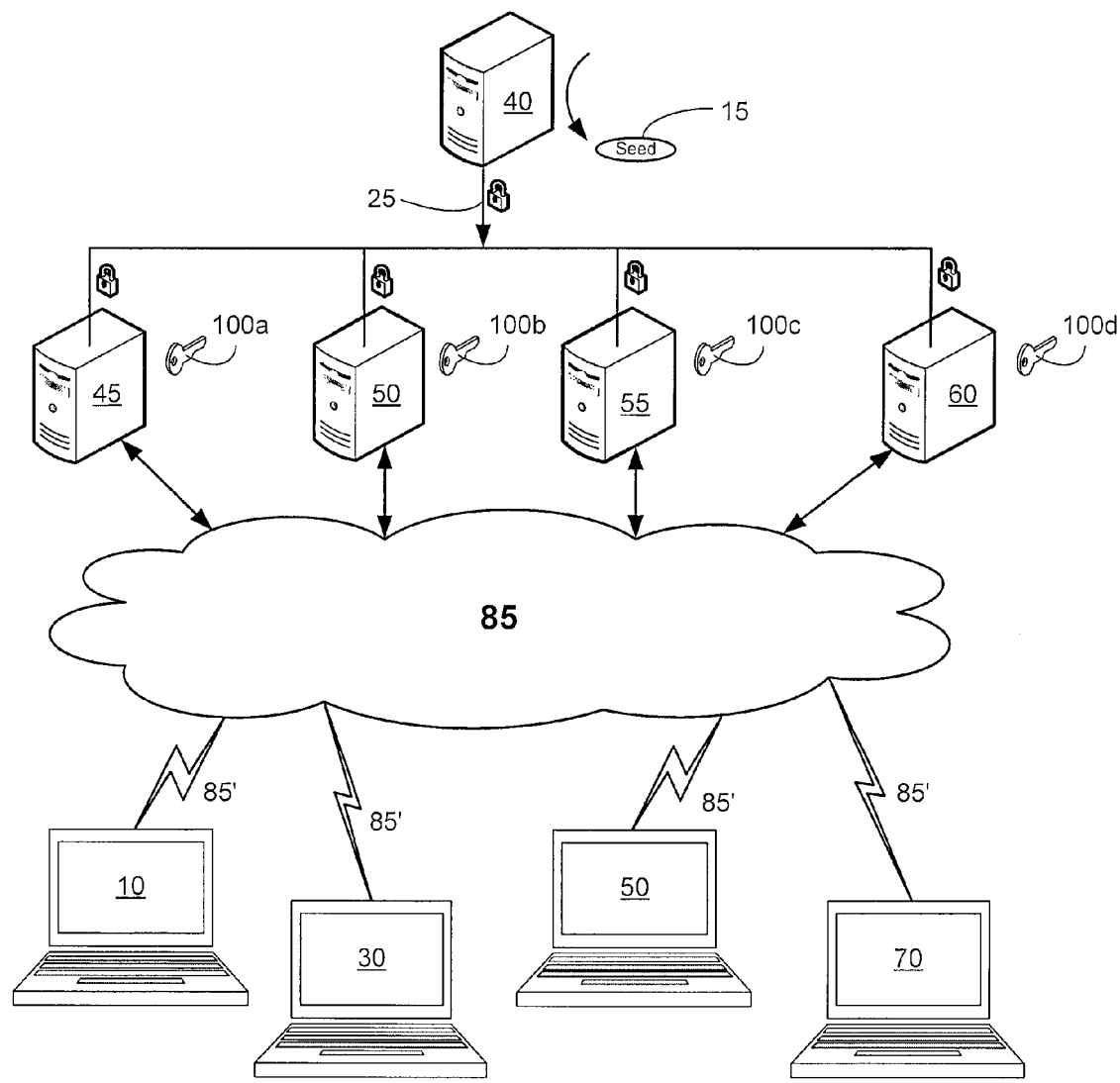
FIG. 1 illustrates an example network of computers.

Generating protected access credentials using a securely distributed base cryptographic seed is described. In the following description, for the purposes of explanation, numerous specific details are set forth in order to provide a thorough understanding of the present invention. It will be appreciated, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Generating a Protected Access Credential Using a Base Cryptographic Seed
   3.1 Process Example
   3.2 Protected Access Credential Payload
   3.3 Protected Access Credential Verification
   3.4 Protected Access Credential Revocation
   3.5 Graphical User Interface
4.0 Implementation Mechanisms—Hardware Overview
5.0 Extensions and Alternatives 1.0 General Overview In an embodiment, generating protected access credentials using a securely distributed base cryptographic seed is performed using a computer implemented process in which a base cryptographic seed is securely distributed. One or more protected access credential parameters are generated, and at least a portion of the parameters are combined with the base cryptographic seed using a hashed message authentication code function to generate a master key.

The base cryptographic seed typically includes at least 512 bits, but values or strings having other lengths may be used in various embodiments.

In an embodiment, at least a portion of the base cryptographic seed is used as a symmetric key for generating the hashed message authentication code. The resulting cryptogram and at least a portion of the generated protected access credential parameters are then incorporated into a protected access credential. The protected access credential may then be sent to a client using an extensible authentication protocol.

In an embodiment, the generated protected access credential parameters include at least one of a nonce, a master key protection period and a master key identifier/time.

In various embodiments, at least a portion of the generated master key may be used as a symmetric key for encrypting/decrypting a portion of the protected access credential parameters and/or used as a symmetric key for generating/verifying hashed message authentication codes used in an Extensible Authentication Protocol based Flexible Authentication via Secure Tunneling Protocol (EAP-FAST protocol).

In an embodiment, at least the base cryptographic seed may be generated by a first server and securely distributed to at least a second server for generating the master key.

Various embodiments may be implemented as computer implemented processes, computer apparatus and/or a computer readable medium configured to carry or perform the foregoing steps.

2.0 Structural and Functional Overview

FIG. 1 illustrates an example network of computers. In an embodiment, one or more client computers 10, 30, 50, 70 are coupled to a network 85 that may include network infrastructure elements such as routers and switches. The client computers 10, 30, 50, 70 may be coupled to the network 85 using wires or using wireless network links 85'. Network 85 is also coupled to one or more network access servers 45, 50, 55, 60 that participate in a local network that includes a master server 40. The network access servers 45, 50, 55, 60 may provide access protection for resources such as data or applications stored on or hosted on the master server 40 or other servers of the local network. The network access servers 45, 50, 55, 60 may comprise packet data routers, switches, or other computers. The master server 40 and the network access servers 45, 50, 55, 60 may comprise special-purpose logic, or memory programmed with special-purpose instructions, which are configured to perform the functions described herein; thus, each of the master server and the network access servers may be implemented as a special-purpose computer, in one example embodiment.

For purposes of illustrating a clear example, FIG. 1 shows four client computers and four network access servers but in other embodiments any number of client computers or access servers may be used. Network 85 may comprise any of a local area network, a wide area network, one or more internetworks, or any combination thereof.

An operational example is now described with reference to FIG. 1 as an example. The broad approach represented in the operational example may be performed in other embodiments using networks or systems other than the example shown in FIG. 1.

The master server 40 generates a base cryptographic seed 15 and one or more related base cryptographic seed parameters. Example base cryptographic seed parameters include a base cryptographic seed index and a base cryptographic seed generation time value. The base cryptographic seed parameters are associated with base cryptographic seed 15 in memory or other computer storage of master server 40.

The base cryptographic seed 15 and related base cryptographic seed parameters are securely distributed as indicated by arrow 25 to the one or more network access servers 45, 50, 55, 60. Obfuscation of at least base cryptographic seed 15 during transport may be performed, to prevent disclosure of the seed value, which could create security vulnerabilities.

In an embodiment, the secure distribution of the base cryptographic seed 15 to network access servers 45, 50, 55, 60 is accomplished using a secure tunnel connection that is established between master server 40 and each of the network access servers. In another embodiment, secure distribution of base cryptographic seed 15 may use an "out-of-band" mechanism, for example, by manually provisioning the access servers 45, 50, 55, 60 with the base cryptographic seed. Upon receiving the base cryptographic seed 15, each of the network access servers 45, 50, 55, 60 stores or installs the seed value in memory or other computer storage.

In an embodiment, once base cryptographic seed 15 has been installed on network access servers 45, 50, 55, 60, a computer-implemented process for generating protected access credentials using base cryptographic seed 15 is performed by each of the network access servers. An example process is described in a separate section herein. The process may be implemented in special-purpose digital logic in the access servers, or in stored program instructions that are loaded into memory, thereby configuring the access servers to perform the process as if the access servers were special-purpose computers.

In general, the process generates master keys 100a, 100b, 100c, 100d which are used by each network access server 45, 50, 55, 60 in generating protected access credentials. The generated protected access credentials are then used to authenticate one or more clients 10, 30, 50, 70 over network 85 using an authentication protocol. An example authentication protocol is EAP-FAST. In an embodiment, generated master keys 100a, 100b, 100c, 100d may be cached in memory of each network access server 45, 50, 55, 60 to reduce computation time.

The process allows each network access server 45, 50, 55, 60 to securely reconstruct master keys 100a, 100b, 100c, 100d, which were originally generated by another of network access servers 45, 50, 55, 60. Accordingly, network access servers 45, 50, 55, 60 may operate semi-autonomously from one another by not being strictly bound to a commonly shared master key. In addition, security concerns arising from frequent master key rotations and synchronization issues among network access servers 45, 50, 55, 60 are largely eliminated by separately deriving master keys 100a, 100b, 100c, 100d from base cryptographic seed 15.

Figure 2:
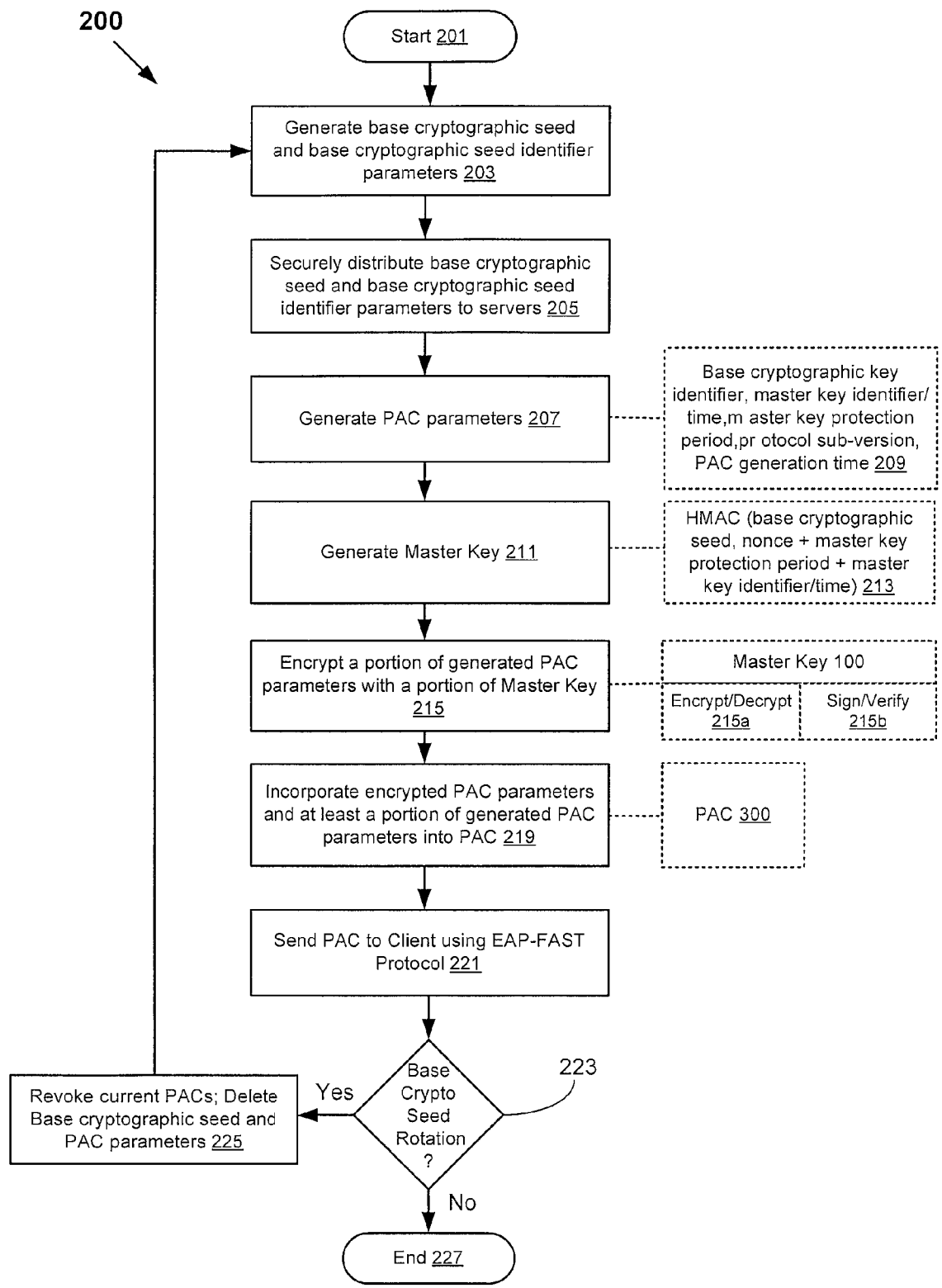
FIG. 2 illustrates generating a protected access credential.

3.0 Generating a Protected Access credential using a Base Cryptographic Seed 3.1 Process Example FIG. 2 illustrates generating a protected access credential. In an embodiment, a process 200 for generating a protected access credential using a base cryptographic seed starts at block 201, and at block 203 a base cryptographic seed is generated. For example, in the context of FIG. 1, master server 40 may generate seed 15. In an embodiment, the base cryptographic seed is initially generated upon a primary installation of the server 40, or as part of a base cryptographic seed rotation operation that is initiated by a system administrator. Unless security situations warrant, the base cryptographic seed does not generally need frequent rotation. However, if rotation of the base cryptographic seed is performed, then all existing protected access credentials and associated cryptographic keys become invalidated.

In an embodiment, the base cryptographic seed may be generated using a random number generator. For example, a Federal Information Processing Standards (FIPS) approved random number generator, implemented as part of an operating system installed on master server 40, may be used. In an embodiment, the base cryptographic seed comprises a relatively large random string value having at least 512 bits, but in other embodiments different seeds, values or strings having other lengths may be used.

At block 205, the base cryptographic seed is securely distributed, optionally including one or more base cryptographic seed identifier parameters, such as a timestamp. In an embodiment, master server 40 securely distributes the seed value to the network access servers 45, 50, 55, 60. An encrypted tunnel may be used as the secure distribution mechanism.

At block 207, a plurality of protected access credential (PAC) parameters are generated. In an embodiment, each of the network access servers 45, 50, 55, 60 independently generates the PAC parameters. Example PAC parameters include, as shown at block 209, a nonce, a master key identifier/time, and a master key protection period. The master key identifier/time may comprise a value indicating the UTC time at which master key 100 became active, derived from the base cryptographic seed identifier timestamp parameter. Further description of values for the other parameters is provided in the next section below in relation to FIG. 3.

In an embodiment, additional protected access credential parameters also may be generated by process 200 to conform to RFC4851 and also to maintain backward compatibility with previous EAP-FAST versions.

Figure 3:
FIG. 3 illustrates an example protected access credential.

FIG. 3 illustrates an example protected access credential 300 and shows an example listing of protected access credential parameters incorporated into the protected access credential 300. Elements of FIG. 3 may be implemented in or stored using digital logic, memory, or other computer storage of the network access servers.

At block 211, process 200 continues by generating a master key. In an embodiment, block 211 comprises generating a 256-bit master key 100, shown in FIG. 1, which incorporates a portion of the PAC parameters, such as a portion of the parameters of block 209. In an embodiment, the process 200 combines the nonce, master key period, and master key identifier/time from the generated protected access credential parameters of block 209 into a hashed messaged authentication code (HMAC) that is signed using base cryptographic seed 15 to result in master key 100. In an embodiment, the master key may be derived as shown in block 213:

h[256]=HMAC-SHA-256 (base cryptographic seed, nonce+master key protection period+master key identifier/time)
where + indicates concatenation.

In an embodiment, alternate methods of combining the nonce, master key protection period and master key identifier/time for generating the hashed messaged authentication code may be implemented. For example, the values may be combined using a logical operation such as XOR and encryption padding. When such an alternate method is used, each of the network access servers 45, 50, 55, 60 implements or uses the same alternate method so that each will derive the master keys in the same manner and with the same result.

In an embodiment, the master key generated at block 211 may be cached in memory to improve network access server performance.

At block 215, a portion of the protected access credential parameters is encrypted using a portion of the master key as the encryption key. An example of the portion of parameters that are encrypted is described further in the next section in relation to FIG. 3. Further, in an embodiment, to accomplish the encryption one portion of master key 100 is used as an encryption/decryption symmetric key 215*a* and another portion is used as a signature/verification symmetric key 215*b*. In an embodiment, the first 128 bits of master key 100 is the encryption/decryption symmetric key 215*a* and the remaining 128 bits of master key 100 is the signature/verification symmetric key 215*b*. The encryption/decryption symmetric key 215*a* and signature/verification symmetric key 215*b* may be derived from overlapping bit blocks which comprise the 256 bit master key 100.

In an embodiment, a block cipher algorithm based on the advanced encryption standard (AES) is used to perform the encryption. Other block ciphers such as 3DES, or the FIPS-140 compliant encryption of KeyWrap with AES, may be used.

At block 219, the encrypted and generated portions of protected access credential parameters are incorporated into a protected access credential. For example, the encrypted portions and non-encrypted portions of parameters 209 are incorporated into PAC 300 of FIG. 3.

At block 221, the protected access credential is sent to a client computer. For example, the PAC 300 is sent from an access server to one of clients 10, 30, 50, 70 using the EAP-FAST protocol.

Decision block 223 tests whether base cryptographic seed rotation is required. Rotation may occur periodically after expiration of a timer, in response to a security event, or in response to action by an administrator, such as a network administrator who operates master server 40. If rotation is required, then at block 225 the current protected access credentials are revoked, and the current base cryptographic seed and protected access credential parameters are deleted. Control moves to block 203 at which generating a seed and parameters may be repeated. Alternatively, a new seed, parameters and PAC may be generated using the steps of block 203 to 221, and the prior or current values may be deleted thereafter.

Alternately, at decision block 223, if base cryptographic seed rotation is not required, then the process 200 ends at block 227.

3.2 Protected Access Credential Payload

Referring again to FIG. 3, an example PAC 300 may comprise some of the protected access credential parameters described in RFC4851 and additional parameter values as shown in bold type. In certain versions of EAP-FAST, protected access credentials have contained the following type, length, and value (TLV) object information fields that were used to select the master key used by all network access servers within a common security domain:

Type 301, a descriptor value having a value of "PAC-Opaque";

Length 303—length in bytes of protected access credential 300;

Version 305—The protected access credential structure version, updated to reflect latest version 3; no changes otherwise;

A-ID 307—Authority identifier of master server 40;

Type 309—SERVER_PROTECTED_DATA, a separate descriptor;

SPI 313—Security Parameter Index—this field is used to identify the particular master key and algorithms used to encrypt the protected access credential;

IV 317—A 128 bit initialization vector used for encrypting and decrypting protected access credential 300;

PAC-Type 325—specifies which version of EAP FAST protected access credential 300 was created for;

PAC-Binding 339—protected access credential 300 key ID 341—Client ID;

CRED_LIFETIME 343—The time at which the protected access credential 300 expires;

Encryption padding 347—bits added to protected access credential 300 to provide the proper number of bits for encryption by a cipher block algorithm;

Authentication tag 349—digital signature of authenticated parameters 353 generated using signature/verification symmetric key 215*b* (FIG. 2). In an embodiment, Authentication tag 349 includes 160 bits and is generated using SHA-1 over the protected access credential payload 353.

In an embodiment, PAC 300 further comprises values for the following:

Base cryptographic seed identifier 315—An index of the base cryptographic seed that was used when the protected access credential 300 was generated. This identifier is used to detect possible changes in the base cryptographic seed.

Master key identifier/time 319—The UTC time at which master key 100 became active. This identifier is used for master key derivation and for regeneration of master key 100 by network access servers 45, 50, 55, 60.

Master key period protection 321—The master key regeneration period at the time protected access credential 300 was issued. This field is used to prevent a case in which a single master key is exposed and used beyond the expiration period (CRED_LIFETIME 343) of protected access credential 300. In an embodiment, master key period protection start time may be determined as: Master key identifier/time 319=PAC generation time 345−((PAC generation time 345−Series_Start_Time) modulo Master key protection period 321). The Series_Start_Time is derived from base cryptographic seed parameters distributed with base cryptographic seed 15.

Nonce 323—A random number generated by each network access server 45, 50, 55, 60 and used in master key derivation. Nonce 323 adds randomness to the master key derivation process. Nonce 323 is randomly generated on each network access server for each master key protection period 321 and may also be regenerated periodically in order to increase variance of the master key derivation algorithm. Uniqueness is not a requirement for nonce 323, but in an embodiment nonce 323 may be formed as a value that is long enough, e.g., 128 bits, to make it unlikely to either repeat or collide with a nonce generated by another network access server.

Protocol Sub-Version 327—A descriptor which provides the EAP-FAST Protocol sub-version to be implemented with protected access credential 300 (EAP-FAST v1 or EAP-FAST v1a)

PAC generation time 345—A universally coordinated time stamp when protected access credential 300 was generated 345. This field is used to protect the time slot in which a protected access credential 300 may be used and is an extension of CRED-LIFETIME 343.

PAC parameters PAC Type 325, Protocol Sub-Version 327, PAC-Binding 339, I-ID 341, CRED-LIFETIME 343 and PAC generation time 345 are encrypted, as indicated by bracket 351, using encryption/decryption symmetric key 215a (FIG. 2). The encrypted values comprise a portion of protected access credential 300 that is opaque to other devices, applications or processes.

3.3 Protected Access Credential Verification

In an embodiment, when accepting a protected access credential 300 from one or more clients 10, 30, 50, 70, network access servers 45, 50, 55, 60 perform the master key generation process described above, with additional verification steps to prevent possible attacks. In an embodiment, additional verification steps may include:

Verifying the time, length and value (TLV) structure of protected access credential 300;

Verifying that the version indicated in Version 305 is supported;

Verifying that the value of A-ID 307 is an approved master server;

Verifying that the base cryptographic seed identifier 315 is one that is used by a receiving network access server;

Optionally verifying protected access credential 300 and/or master key revocation status;

Verifying that the PAC generation time 345 falls within Master key identifier/time 319 to satisfies the following relationship:

Master key identifier/time 319≦PAC generation time 345<(Master key identifier/time 319+Master key protection period protection 321)

Deriving the master key 100, if the master key is not in the cache of the access server, using Master key identifier/time 319, Master key protection period protection 321, and nonce 323 stored within protected access credential 300, and thereafter verifying the Authentication tag 349 using signature/verification symmetric key 215b obtained from derived master key 100;

Decrypting and verifying the protected access credential-opaque using encryption/decryption symmetric key 215a obtained from derived master key 100; verifying the protected access credential-opaque the time, length and value (TLV) structure;

Verifying that the value of CRED-LIFETIME 343 has not expired;

Verifying that the value of I-ID 341 is correct for the client requesting network access;

Optionally verifying PAC generation time 345 and CRED-LIFETIME 343 expiration schemes against network access server configured protected access credential time, length and value (TLV) generation requirements.

3.4 Protected Access Certificate Revocation

In various embodiments, revocations of EAP-FAST protected access credential 300 or master key 100 may be performed in several ways. Revocation of protected access credential 300 may be based on protected access credential parameters. For example, authentication tag 349 could be read by a network access server and compared against a revocation list. If the network access server finds a match, then the protected access credential associated with the authentication tag is revoked.

In another approach, revocation of a protected access credential may be performed if a master key becomes compromised. For example, the PAC parameters used in deriving the master key, Master key identifier/time 319, Master Key protection period 321 and nonce 323 could be checked by a network access server against a revocation list. If the network access server discovers a match among any of the three PAC parameters, the protected access credential if revoked.

In another approach, revocation of all protected access credentials and all master keys may be performed by a system administrator by revoking the currently used base cryptographic seed and replacing the revoked base cryptographic seed with a new base cryptographic seed. As a result, existing PAC values that were based on the revoked base cryptographic seed become impossible to verify and use, and are effectively revoked.

3.5 Graphical User Interface (GUI)

Figure 4:
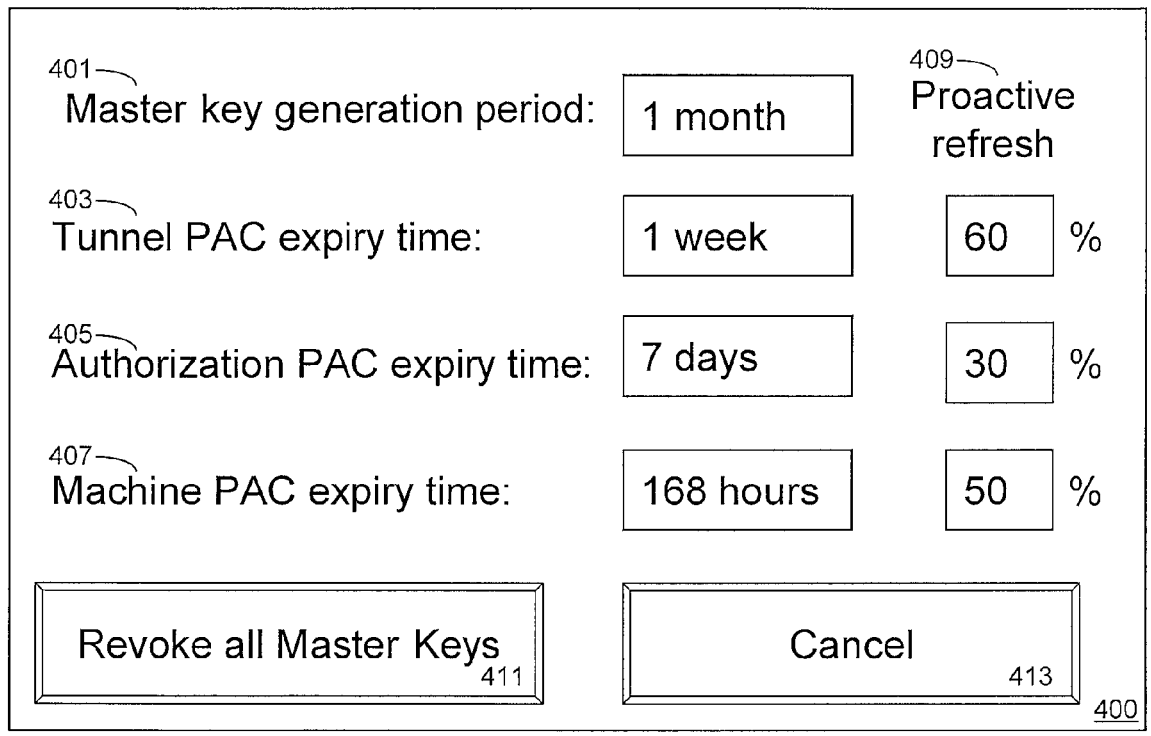
FIG. 4 illustrates an example graphical user interface.

FIG. 4 illustrates an example graphical user interface for managing one or more protected access credential parameters. In an embodiment, the graphical user interface 400 may be configured to control several operations. In an embodiment, master server 40 may generate and display the GUI 400 on a display device that is coupled to the master server. The master server 40 may be configured with logic that can receive user input from an administrator or other user of the master server who is interacting with the GUI, and can respond by altering stored parameters or the operation of process 200 in response to changes in values that are input using the GUI.

In an embodiment, graphical user interface 400 may be configured to allow changes to be made in the master key generation period through a master key generation period data entry field 401. Input values could include various time period values expressed in days, months, years, or other values. Values that are input using master key generation period data entry field 401 may have some impact on both performance and security of EAP-FAST. For example, longer generation periods may result with the master key becoming less secure as an attacker might have more time to discover an active master key. Conversely, re-deriving master keys more often may have some implications on network access server performance as more complex calculations are being performed. An example value representing a reasonable balance between security and network server performance is shown as a 1 month interval in FIG. 4.

In an embodiment, graphical user interface 400 may be configured to allow changes to be made to the expiration time or time to live for different types of PAC. For example, a Tunnel PAC expiry time field 403 may receive a time value representing a time to live for the Tunnel type of PAC, which is used for authentication tunnel establishment. As an example, the expiry time is shown as 1 week, but other expiration times may be used in other embodiments.

In an embodiment, graphical user interface 400 may be configured to allow changes to be made to a time to live for an Authorization PAC. For example, an authorization PAC expiry time field 405 may be provided to set the time to live for an Authorization PAC that is used for user authorization purposes. Values entered in field 405 cause configuring the master server so that an Authorization type of protected access certificate expires after the period of time represented by the entered values. As an example, the period of time is 7 days, but in other embodiments, other time values may be used. The values entered in field 405 are reflected in each PAC that is generated after entry of the values.

In an embodiment, graphical user interface 400 may be configured to allow changes to be made to the time to live for an Authorization type of PAC used for authenticating machines. For example, a machine PAC expiry time field 407 may be provided and values entered in the field cause the master server to mark an Authorization protected access certificate, used for machine authentication, as expired after a period of time specified in the field. In the example of FIG. 4, the period of time is 168 hours.

In an embodiment, graphical user interface 400 may be configured to allow establishment of active refresh rates to minimize the possibility of a mobile attacker from compromising security of either master keys or PAC keys. For example, GUI 400 may comprise active refresh rate fields that allow establishing specified refresh rates for Tunnel PAC expiry time 403, authorization PAC expiry time 405, or machine PAC expiry time 407. The particular values shown in FIG. 4 are provided merely to illustrate a clear example and are not required; alternate embodiments may use any appropriate values.

In an embodiment, graphical user interface 400 may be configured to allow revocation of all master keys, which also results in revocation of all protected access credentials. For example, a Revoke all Master keys control 411 may be provided which, when selected, causes the revocation and replacement of base cryptographic seed 15. Further, in response to selecting control 411, master server 40 automatically revokes all past master keys and protected access credentials. In an embodiment, the revocation operation causes the GUI 400 to display a warning message of the possible outcome of its implementation. In an embodiment, a Cancel control 413 is provided to prevent accidental implementation of the Revoke all Master keys control 411.

In an embodiment, proactive refresh fields 409 may receive values that configure the server about when to refresh the client's PAC when the client re-authenticates using a previously provisioned PAC.

4.0 Implementation Mechanisms—Hardware Overview

Figure 5:
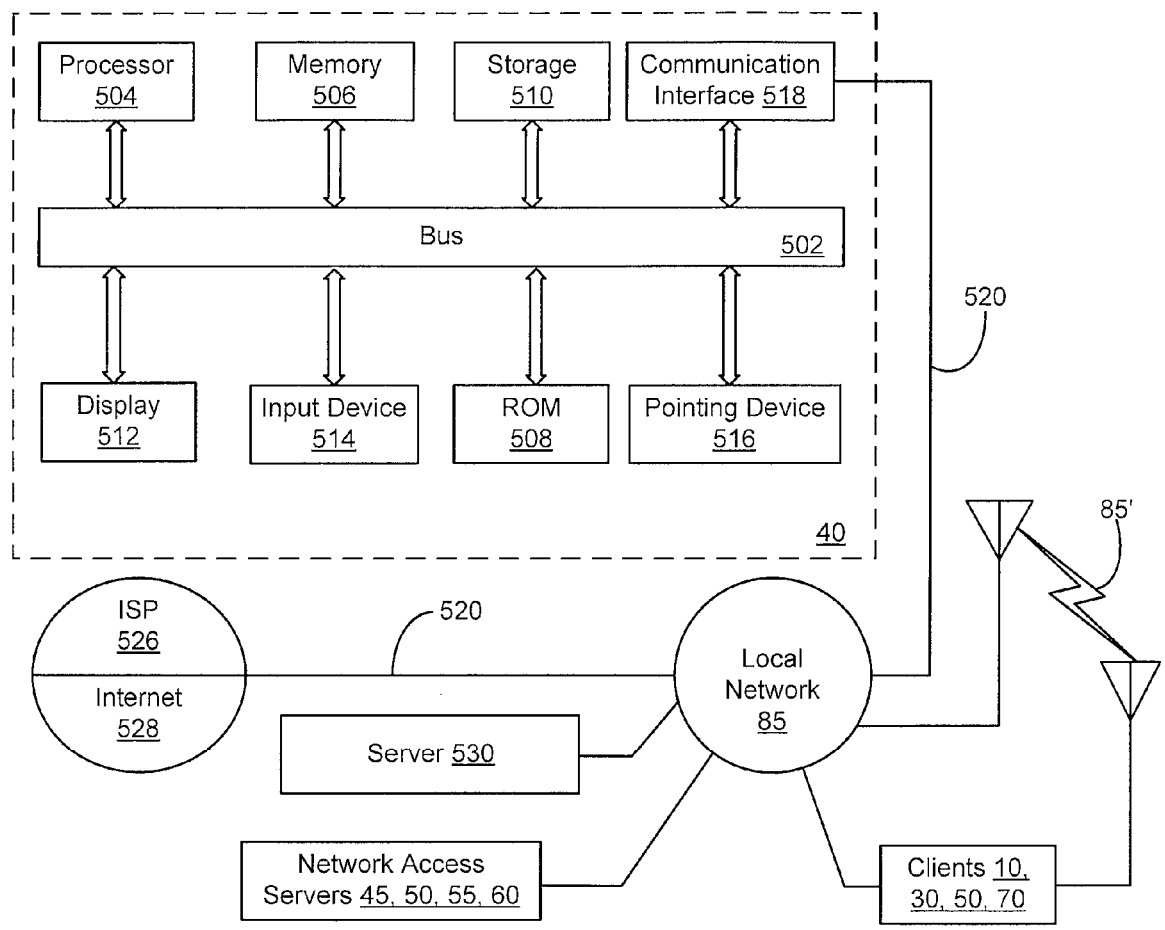
FIG. 5 illustrates an example computer system with which an embodiment may be implemented.

FIG. 5 is a block diagram that illustrates a computer system 40 upon which an embodiment of the invention may be implemented. Computer system 40 includes a bus 502 or other communication mechanism for communicating information, and a processor 504 coupled with bus 502 for processing information. Computer system 40 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 40 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 40 may be coupled via bus 502 to a display 512, such as a cathode ray tube (CRT) or flat panel display, for displaying information to a computer user. An input device 514, including alphanumeric and other keys, is coupled to bus 502 for communicating information and command selections to processor 504. Another type of user input device or pointing device 516 for cursor control, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 40 for implementing the techniques described herein. According to one embodiment of the invention, those techniques are performed by computer system 40 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 40, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 40 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 40 also includes a communication interface 518 coupled to bus 502. Communication interface 518 provides a two-way data communication coupling to a network link 520 that is connected to a local network 85. For example, communication interface 518 may be an integrated services digital network (ISDN), digital subscriber line (DSL) card or a modem to provide a data communication connection to a corresponding type of telephone line. As another example, communication interface 518 may be a local area network (LAN) card to provide a data communication connection to a compatible LAN. Wireless network links 85' may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 85 or via wireless network links 85' to one or more client computer systems 10, 30, 50, 70 or to data equipment operated by an Internet Service Provider (ISP) 526. ISP 526 in turn provides data communication services through the world wide packet data communication network now commonly referred to as the "Internet" 528. Local network 85, wireless links 85' and Internet 528 use electrical, electromagnetic or optical signals that carry digital data streams. The signals through the various networks and the signals on network link 520 and through communication interface 518, which carry the digital data to and from computer system 40, are example forms of carrier waves transporting the information.

Computer system 40 can send messages and receive data, including program code, through the network(s), network link 520 and communication interface 518. In the Internet example, a server 530 might transmit a requested code for an application program through Internet 528, ISP 526, local network 85 and communication interface 518. The received code may be executed by processor 504 as it is received, and/or stored in storage device 510, or other non-volatile storage for later execution. In this manner, computer system 40 may obtain application code in the form of a carrier wave.

In another example, one or more network access servers 45, 50, 55, 60 may control access to local network 85 or wireless network links 85' by authenticating client computers 10, 30, 50, 70 using an established authentication protocol before access is granted.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented process, comprising:
   receiving, at a first computer of a plurality of computers, from a master key server, a base cryptographic seed and base cryptographic seed parameters through a secure network connection to the master key server;
   wherein the base cryptographic seed and the base cryptographic seed parameters are not specific to any of the plurality of computers;
   wherein the master key server generates the base cryptographic seed and the base cryptographic seed parameters and distributes the base cryptographic seed and the base cryptographic seed parameters to two or more computers from the plurality of computers, including the first computer, for each of the plurality of computers to generate its own unique master key;
   generating, at the first computer, one or more protected access credential parameters;
   combining said base cryptographic seed with at least a portion of said generated protected access credential parameters using a hashed message authentication code function to generate a master key from a plurality of master keys;
   encrypting at least a portion of said generated protected access credential parameters using at least a portion of said generated master key;
   incorporating said encrypted protected access credential parameters and at least a portion of said generated protected access credential parameters into a protected access credential;
   wherein the process is performed by one or more computing devices.

2. The process of claim 1 further comprising sending said protected access credential to a client computer using an extensible authentication protocol.

3. The process of claim 1 wherein said generated protected access credential parameters include at least one of a nonce, a master key protection period and a master key identifier/time and any combination thereof.

4. The process of claim 1 wherein said base cryptographic seed includes at least 512 bits; wherein the base cryptographic seed parameters comprise a seed index and a seed generation time value.

5. The process of claim 1 wherein at least a portion of said base cryptographic seed is a symmetric key for generating said hashed message authentication code.

6. The process of claim 1 wherein at least a portion of said master key is a symmetric key for encrypting and decrypting said portion of said protected access credential parameters.

7. The process of claim 1 wherein at least a portion of said master key is a symmetric key for generating and verifying hashed message authentication codes.

8. The process of claim 1 wherein at least said base cryptographic seed is securely distributed to the plurality of computers, each of which is an access server.

9. A data processing system, comprising:
   one or more processors;
   a memory coupled to said one or more processors including programmatic instructions stored therein which when executed by said one or more processors causes said one or more processors to:
   receive, at a first computer from a plurality of computers, from a master key server, a base cryptographic seed and base cryptographic seed parameters through a secure connection to the master key server;
   wherein the base cryptographic seed and the base cryptographic seed parameters are not specific to any of the plurality of computers;
   wherein the master key server generates the base cryptographic seed and the base cryptographic seed parameters and distributes the base cryptographic seed and the base cryptographic seed parameters to two or more computers from the plurality of computers, including the first computer, for each of the plurality of computers to generate its own unique master key;

generate, at the first computer, one or more protected access credential parameters;

combine said base cryptographic seed with at least a portion of said generated protected access credential parameters using a hashed message authentication code function to generate a master key from a plurality of master keys;

encrypt at least a portion of said generated protected access credential parameters with at least a portion of said generated master key;

incorporate said encrypted protected access credential parameters and at least a portion of said protected access credential parameters into a protected access credential.

10. The system of claim 9 wherein said memory further includes programmatic instructions which when executed by said one or more processors causes said one or more processors to send said protected access credential to a client using an extensible authentication protocol.

11. The system of claim 9 wherein said generated protected access credential parameters further includes at least one of: nonce, a master key protection period and a master key identifier/time and any combination thereof.

12. The system of claim 9 wherein said base cryptographic seed includes at least 512 bits; wherein the base cryptographic seed parameters comprise a seed index and a seed generation time value.

13. The system of claim 9 wherein at least a portion of said base cryptographic seed is a symmetric key for generating said hashed message authentication code.

14. The system of claim 9 wherein at least a portion of said master key is a symmetric key for encrypting and decrypting said portion of said protected access credential parameters.

15. The system of claim 9 wherein at least a portion of said master key is a symmetric key for generating and verifying hashed message authentication codes.

16. The system of claim 9 wherein at least said base cryptographic seed is securely distributed to the plurality of computers, each of which is an access server.

17. A non-transitory computer-readable volatile or non-volatile storage medium comprising one or more sequences of instructions which when executed by one or more processors cause the one or more processors to:

receive, at a first computer from a plurality of computers, from a master key server, a base cryptographic seed and base cryptographic seed parameters through a secure connection to the master key server;

wherein the base cryptographic seed and the base cryptographic seed parameters are not specific to any of the plurality of computers;

wherein the master key server generates the base cryptographic seed and the base cryptographic seed parameters and distributes the base cryptographic seed and the base cryptographic seed parameters to two or more computers from the plurality of computers, including the first computer, for each of the plurality of computers to generate its own unique master key;

generate, at the first computer, one or more protected access credential parameters;

combine said base cryptographic seed with at least a portion of said generated protected access credential parameters using a hashed message authentication code function to generate a master key;

encrypt at least a portion of said generated protected access credential parameters with at least a portion of said generated master key from a plurality of master keys;

incorporate said encrypted protected access credential parameters and at least a portion of said generated protected access credential parameters into a protected access credential.

18. The non-transitory storage medium of claim 17 further comprising instructions which when executed cause said one or more processors to send said protected access credential to a client using an extensible authentication protocol.

19. The non-transitory storage medium of claim 17 wherein at least said base cryptographic seed is generated by a first processor and is securely distributed to at least a second processor for generating said master key.

20. The non-transitory storage medium of claim 17 wherein at least a portion of said master key is a symmetric key for encrypting and decrypting said portion of said protected access credential parameters.

* * * * *